Patented Nov. 9, 1937

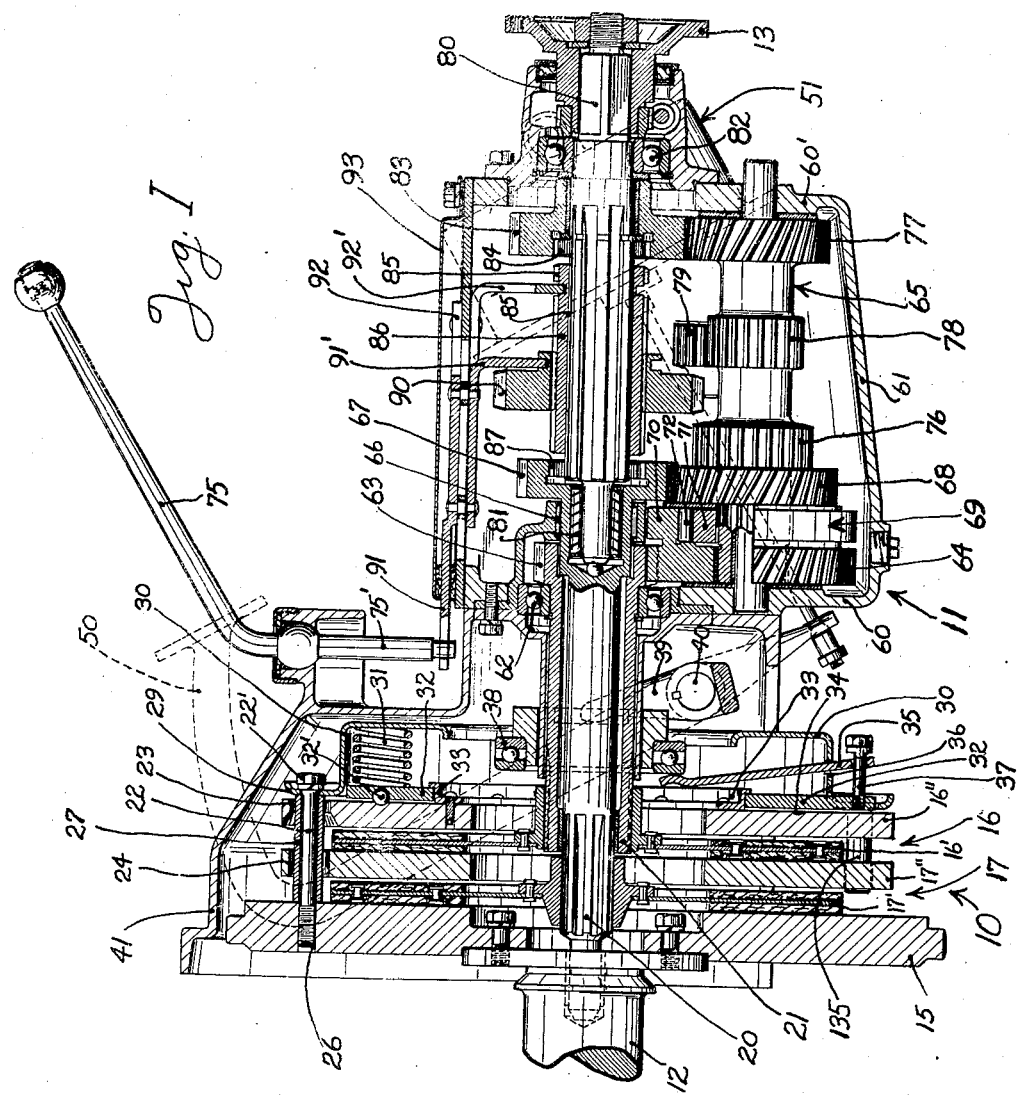

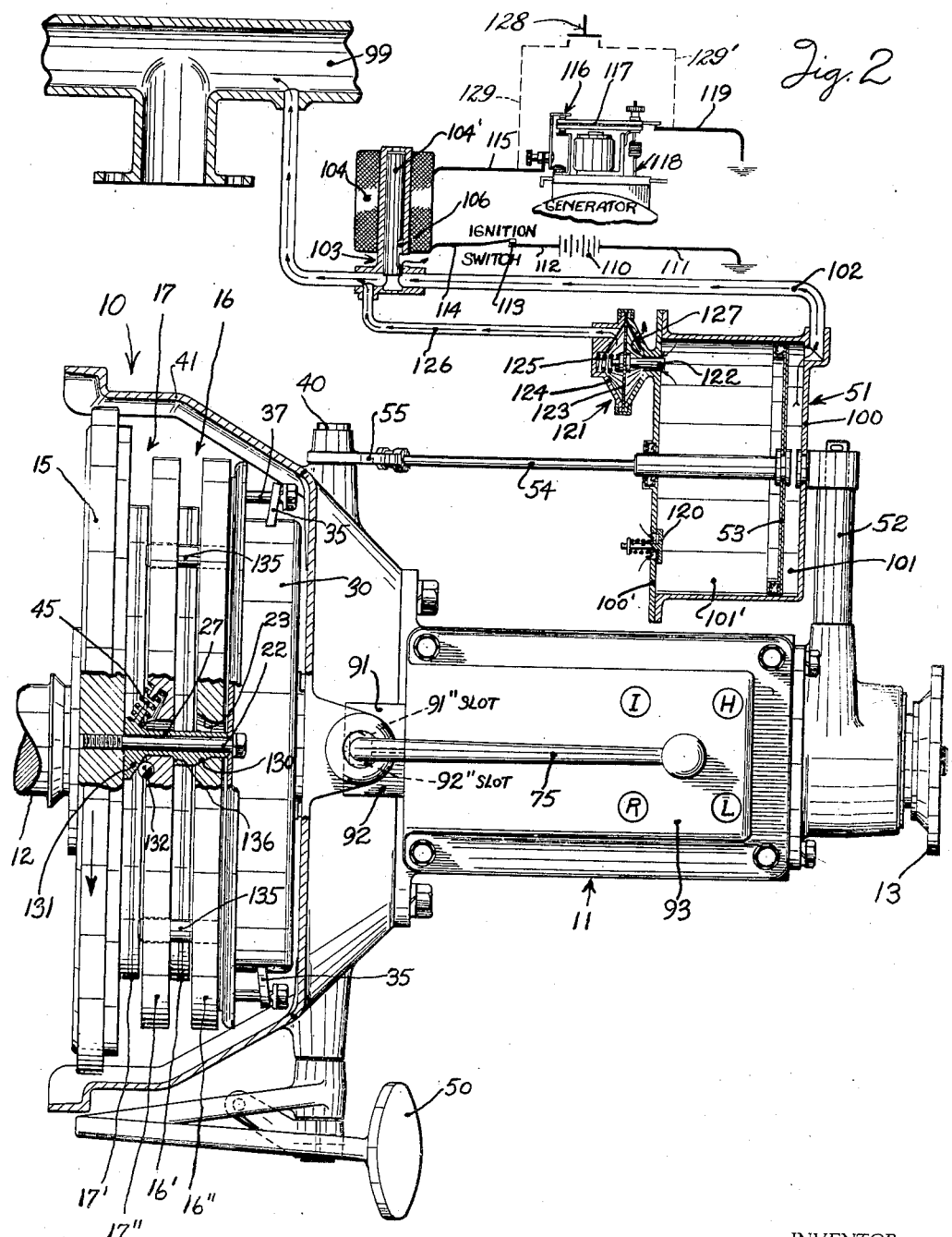

2,098,716

UNITED STATES PATENT OFFICE 2,098,716

TRANSMISSION MECHANISM

Simeon Budlong, Chicago, Ill.

Application January 24, 1934, Serial No. 708,134

5 Claims. (Cl. 74—330)

The invention relates generally to transmission mechanisms and more particularly to variable speed mechanism of this character such as is adapted for use in automobiles.

The primary object of the invention is to provide a new and improved transmission for automobiles which will effect economy in operation through more efficient transmission of the power, improve the performance of the vehicle by reason of its greater flexibility and increased responsiveness and adaptability in various difficult traffic situations, and which simplifies the task of driving by reducing and simplifying the manual operations which must be performed by the driver.

In the automotive trade it is generally recognized that efficient operation of a vehicle on long drives over smooth roads requires a higher ultimate gear ratio than that customarily employed in the high gear transmission path, and yet, that this conventional high gear ratio as well as the other conventional ratios must be retained in order that the exacting requirements of city traffic may be satisfied.

To meet this situation some builders have adopted a shiftable over-drive gearing, or a shiftable dual-ratio gearing between the usual transmission gear box and the rear axle so as to provide a supplemental country driving range of gearing. Such supplemental gearing constitutes, in effect, a second shiftable transmission which requires manual shifting or attention to change from one ratio to the other. The higher of these ratios, which for convenience may be termed the over-drive, is such that rapid acceleration cannot be obtained, and hence the over-drive must be manually shifted when the driver desires accelerating power to pass a vehicle travelling at high speed. Such down-shifting of the over-drive control involves conditioning of the engine and clutch mechanism to permit the shift, and after passing the vehicle, a similar engine conditioning and shifting operation must be performed manually in order to return to the over-drive.

Another object, therefore, of the present invention is to provide a transmission mechanism wherein the gearing provides a traffic driving range of gearing appropriate for frequent starting and stopping of the vehicle, and a country driving range appropriate for high speed operation under light loads, and arranged while operating in said country driving range to permit instantaneous manually initiated reduction of the gear ratio at any engine speed for purposes of rapid acceleration and to return automatically to its higher ratio when the acceleration requirements have been satisfied.

Another object is to provide a transmission mechanism so constructed that the conventional sequence of three movements of the quadrant-type shift lever, causes six gradually increasing gear ratios to be established successively in the drive, whereby to increase the efficiency of power application without complicating the well established gear-shifting routine.

Other objects and advantages will become apparent from the following description, taken in connection with the accompanying drawings which illustrate a preferred embodiment of the invention, and in which:

Fig. 1 is a vertical central sectional view of a transmission embodying the features of the invention.

Fig. 2 is a plan view of the transmission showing a part of the clutch mechanism in section, and embodying a diagrammatic illustration of the vacuum control system.

While my invention is susceptible of embodiment in many different forms, I have shown in the drawings and will herein describe in detail one such embodiment, with the understanding that the present disclosure is to be considered as an exemplification of the principles of the invention and is not intended to limit the invention to the embodiment illustrated. The scope of the invention will be pointed out in the appended claims.

As illustrated herein the invention is embodied in an automotive transmission wherein an automatically controlled multi-speed clutch mechanism 10 and a dual-range multiple speed transmission gearing mechanism 11 are interposed in series between a driving or engine crank shaft 12 and a coaxial driven shaft or coupling element 13, which element 13 is in the complete vehicle, attached in driving relation to the differential reduction gearing of the rear axle assembly in a conventional manner.

*The multiple-speed clutch mechanism*

The clutch mechanism 10, as herein illustrated, is associated with a fly wheel 15 which is bolted to the driving shaft 12, the clutch comprising a low speed clutch 16 and a high speed clutch 17 adapted for successive driving engagement. As shown in Fig. 1, the driven member of the high speed clutch 17 comprises a friction disk 17' splined on a shaft 20 coaxial with the driving shaft, and adapted for engagement on its opposite side surfaces with the fly wheel and a disklike driving member 17" which rotates with the fly wheel and is shiftable longitudinally to engage the clutch 17. Similarly, the driven member of the low speed clutch comprises a friction disk 16' splined on a concentric sleeve 21 on the opposite side of the driving member 17", and engageable on its opposite side surfaces by the member 17" and a low speed clutch driving member 16" which rotates with the fly wheel and is shiftable longitudinally to effect engagement of the clutch 16.

The high and low speed driving members 16" and 17" are preferably mounted on the fly wheel 15 by a plurality of supporting studs 22 extending through apertures 23 and 24 formed in the members 16" and 17" respectively adjacent to and spaced about their peripheries, the ends of the studs being screw threaded into the fly wheel at 26. Surrounding the studs are a plurality of supporting sleeves 27 which at one end abut the fly wheel, and between the other ends of which and the heads 22' of the studs a flange 29 of an annular spring housing 30 is clamped. Within the housing 30 a plurality of expansive coil springs 31, positioned at peripherally spaced points about the housing, act to force a pressure plate 32 toward the driving member 16" so as to impart clutch-closing movement thereto. Preferably the pressure plate 32 comprises a ring-like member the inner periphery of which rides in and is positioned both axially and radially by an annular bearing member 33 carried by the driving member 16", and limited rotational movement of the member 16" with relation to the rotationally stationary pressure plate 32 is facilitated by provision of a plurality of bearing balls 32' carried by the plate and riding in a groove 34 in the adjacent surface of the member 16".

To oppose the springs 31 and provide for opening of the clutch, a plurality of clutch release levers 35, extending radially through apertures 36 in the side wall of the spring housing 30, are connected at their outer ends to headed studs 37 which project longitudinally from the pressure plate 32, said studs extending through apertures in the ends of the levers so that clutch releasing movement only may be applied to the plate 32 by the levers. At their inner ends the levers 35 engage a release bearing 38 which may be shifted to shift the levers and withdraw the pressure plate 32. Actuation of the release bearing is caused by an arm 39 carried by a transverse rock shaft 40 which is mounted in a bell housing 41 surrounding the upper portion of the clutch assembly. When the pressure plate 32 is withdrawn a positive releasing movement of the low speed clutch driving member 16" results due to the axial restraint of the pressure plate by the bearing member 33.

It will be evident that clutch closing actuation of the pressure plate 32 by the springs 31 may be transmitted, after closure of the low speed clutch 16, to impart closing movement to the high speed clutch driving member 17", and as illustrated in Fig. 2 of the drawings, means is provided to urge the high speed clutch to its open position when the pressure plate 32 is withdrawn so as to cause the high and low speed clutches to be opened successively during such withdrawal of the pressure plate. This means preferably comprises a plurality of expansive coil springs 45, one positioned at the base (left hand end, Fig. 2) of each sleeve 27 so as to act in an angular direction against the driving member 17" and urge the same away from its driven member 17'.

To open or disengage the clutches, rocking movement may be imparted to the shaft 40 selectively by a conventional foot pedal 50 fixed to the shaft 40, or by a vacuum controlled unit comprising a cylinder 51 pivoted on a hub 52 and having a piston 53 therein connected to the shaft 40 by a piston rod 54 and an arm 55 fixed on the shaft 40.

*Dual-range gearing mechanism*

The present multiple-speed clutch mechanism 10 above described is associated with the gearing mechanism 11 through the shaft 20 and the concentric sleeve 21 which project from the bell housing 41 through the adjacent end 60 of a gear box 61 in which the gearing is housed. In the end wall 60 a bearing 62 supports the sleeve 21 and adjacent to the bearing a gear 63 is formed on the sleeve to drive a meshing, relatively large gear 64 which is rotatably mounted on a parallel counter-shaft 65. The end of the shaft 20 projects beyond the sleeve 21 and the gear 63 through a stationarily mounted needle bearing 66, and carries on its end an integral gear 67 which meshes with a gear 68 formed integral with the counter-shaft 65. The ratio of the gears 63 and 64 from the low speed clutch sleeve 21 is slightly greater than the ratio of the gears 67 and 68, and hence an over-running unit 69 is provided between the gear 64 and the counter-shaft 65. This unit comprises an outer ring 70 integral with the gear 64, an inner member 71 splined to the counter-shaft 65 and a plurality of pawl members 72 arranged to permit over-running of the counter-shaft with respect to the gear 64 when both the high and low speed clutches are engaged.

Thus the counter-shaft may be rotated successively at two different speeds as the low and high speed clutches are successively engaged, and such rotation may be transmitted through various graduated reduction gears to the driven element 13 in accordance with the manual setting of a conventional gear shift lever 75 mounted on the bell housing 41. As herein shown the reduction gearing comprises a relatively small gear 76 for low speed connection, formed on the counter-shaft adjacent to the gear 68, a somewhat larger gear 77, for an intermediate connection, formed on the counter-shaft adjacent to the other end thereof, and a small gear 78, formed on the counter-shaft between and spaced from the gears 76 and 77 and driving a back gear 79 for reversing the driving connection. Between the driven element 13 and the shaft 20 a shaft 80 extends, one end being rotatably journaled by a bearing 81 in the end of the shaft 20, and the other end projecting through a bearing 82 in the other end wall 60' of the gear box and being drivingly connected to the driven element 13.

On the shaft 80 adjacent to the end wall 60' of the gear box, a gear 83 is rotatably mounted in mesh with the intermediate driving gear 77 of the counter-shaft, the gear 83 having internal clutch teeth 84 thereon for engagement by external splines 85 formed on a sleeve 86 which is internally splined at 85' on the shaft 80 so as to form an intermediate driving connection from the counter-shaft to the shaft 80. At its other end the splines of the sleeve 86 are adapted for engagement with a complemental internal clutch element 87 formed on the gear 67 so as to form a direct or high speed drive from the gear 67 to the shaft 80.

To form selectively a low speed drive or a reverse drive between the counter-shaft and the shaft 80, a relatively large gear 90 is splined on the sleeve 86 for movement in opposite directions from the inactive position of Fig. 1 into engagement selectively with the gear 76 or into engagement with the back gear 79. The sleeve 86 and the gear 90 are adapted for actuation by slides 91 and 92 mounted in the cover 93 of the gear box, and having forks 91' and 92' engaging grooves in the gear and the sleeve respectively. In lateral movement of the gear shift lever 75, its lower end 75' engages selectively with opposed slots 91" and 92" formed in the edges of the slides 91 and 92 (Fig. 2) so that shifting movement of the lever to the various quadrant positions of the standard or conventional automotive gear shift causes engagement of the gears in the various relations described.

Thus movement of the shift lever 75 to the position R of Fig. 2, actuates the slide 91 to shift the gear 90 to the rear and into engagement with the back gear 79 whereby to form a reverse drive to the shaft 80. Shifting of the lever in the opposite direction to the position L of Fig. 2 causes the gear 90 to be engaged with the low speed gear 76 of the counter-shaft.

When the shift lever 75 is moved to the right and shifted to the position I of Fig. 2 it actuates the slide 92 to engage the sleeve 86 with the clutch 84 of the gear 83, thereby fixing the gear to the shaft 80 and providing an intermediate drive from the counter-shaft to the shaft 80. In movement of the lever 75 to its position H of Fig. 2, the sleeve 86 is clutched to the gear 67 so as to establish a direct drive from the gear 67 to the shaft 80. The shifting operation or routine, therefore, corresponds to that of the conventional automotive gear shift.

Thus, by virtue of the two clutches 16 and 17, each functioning in each of the three forward driving relationships of the gearing, six forward driving speeds or gear ratios are available in the present device. In the lowest available forward ratio, drive is transmitted through the low speed clutch 16, the sleeve 21, gears 63 and 64, over-running clutch 72, gears 76 and 90, sleeve 86 to the shaft 80. Upon engagement of the high speed clutch 17, a second ratio becomes effective through the shaft 20, gears 67 and 68, gears 76 and 90, and the sleeve 86 to the shaft 80.

The third and fourth available ratios are effective when the gear shift lever is in its position I of Fig. 2. With the gearing thus set, the third ratio is effective upon closure of the clutch 16 and prior to the closure of the clutch 17, and it includes the clutch 16, the sleeve 21, gears 63 and 64, the over-running clutch 72, the counter-shaft 65, gears 77 and 83, the clutch 84—85, and the sleeve 86 to the shaft 80. Upon engagement of the clutch 17, the fourth ratio becomes effective and transmits drive through the clutch 17, the shaft 20, gears 67 and 68, the counter-shaft 65, gears 77 and 83, the clutch 84—85, and the sleeve 86 to the shaft 80.

The fifth and sixth available forward driving ratios are available when the lever 75 is in the position H of Fig. 2 so as to engage the sleeve 86 with the clutch teeth 87. Upon engagement of the clutch 16, the fifth ratio transmits drive through the clutch 16, the sleeve 21, gears 63 and 64, the clutch 72, gears 68 and 67, the clutch teeth 87, and the sleeve 86 to the shaft 80. When the clutch 17 is engaged, the drive is in its sixth or direct drive relationship, and drive is transmitted from the clutch 17 through the shaft 21, the clutch teeth 87, and the sleeve 86 to the shaft 80.

*Automatic control*

In accordance with the present invention, the clutch actuation is automatically governed by an inter-related system of control depending in part upon a function of the engine operation, and in part, upon the load interposed in the power transmission path. Thus the vacuum unit 51 is controlled as to its clutch opening action in accordance with the speed of the engine as well as by vacuum conditions in the engine manifold 99, and in its releasing or clutch closing movement the unit is controlled by the vacuum conditions in the manifold. To this end the vacuum cylinder has end walls 100, 100' at its opposite ends to provide chambers 101, 101'. From the chamber 101 a vacuum line 102 extends to the manifold 99 so that the high suction in the manifold during low speed or idle operation of the engine serves to exhaust the chamber 101 and thus release or open the clutch.

High vacuum conditions may also exist during high speed operation of the engine under light load, and hence means is provided to prevent actuation of the vacuum unit and the consequent undesired opening of the clutch at high speeds. This means preferably comprises a valve 103 interposed in the vacuum line 102 and operated in response to a function of the engine speed. In the present instance the valve 103 is actuated by a solenoid 104 so that its valve member 104' assumes the position of Fig. 2 when the solenoid is energized. In this position of the valve member, the chamber 101 is connected to the manifold and under high vacuum conditions the vacuum unit is actuated to open the clutch. If, however, the solenoid 104 is de-energized, the valve member 104' shifts downwardly to close the passage to the manifold, and through a passage 106 in the valve member, to open the chamber 101 of the cylinder to atmosphere.

To provide a control circuit for the solenoid coil 104 one terminal of the battery 110 is grounded at 111, and a wire 112 extends to one contact of the ignition switch 113. From the other terminal of the ignition switch a wire 114 extends to one end of the solenoid coil. The other end of the coil is connected by a wire 115 to the stationary contact of a switch 116, which has its movable contact mounted on the shiftable armature 117 of the conventional generator cut-out unit 118 so that the switch 116 is opened when the armature 117 is actuated due to high speed operation of the generator. The cut-out unit is in other respects conventional in construction and operation. A wire 119 connects the movable contact of the switch 116 to ground so as to complete the solenoid control circuit.

Preferably, the closed chamber 101' at the opposite end of the vacuum cylinder 51 is utilized to provide an air bank to cushion and control the return movement of the piston and prevent rapid clutch engagement during relatively low speed operation of the engine. For this purpose, a one-way check valve 120 is provided to govern the passage of air through the wall 100' and permit rapid entry of air when the unit is actuated, while an air bleed valve 121 is provided to govern the escape of air from the chamber 101'. The valve 121 provides an outlet which may be varied by movement of the tapered valve member 122 under the control of a vacuum governed diaphragm 123 mounted in the valve housing 124. A spring 125 urges the valve to its open position, and through a constantly open connection 126 with the manifold, high vacuum conditions in the manifold act on the other side of the diaphragm to draw the valve member toward its closed position. Air escapes from the valve housing through a vent opening 127.

The switch 116 of the generator cut-out is, of course, closed when the engine is at rest, and hence the closure of the ignition switch 113 in starting the engine causes instantaneous opening of the vacuum cut-out valve 103. The vacuum unit 51 is therefore actuated in the starting of the engine to open the clutch 10, and the open position is maintained so long as the engine operates at idling speed. An increase in the engine speed appropriate to starting of the vehicle serves, however, to reduce the vacuum so that the vacuum unit releases the clutch for engagement by the clutch springs 31, the releasing movement of the vacuum unit being to some extent governed by the engine speed and power due to the banking action resulting from the position of the vacuum controlled bleed valve 121.

To secure a supplemental manual control of the vacuum actuator, a shunt for the switch 116 may be provided as indicated by the dotted lines in Fig. 2. This circuit comprises a normally open push button switch 128 located at the top of the gear shift lever 75 (Fig. 1) and connected by wires 129 and 129' to the wires 115 and 119. Thus, by depressing the switch 128 during high speed operation of the vehicle, the solenoid coil 104 may be energized and the vacuum line 102 connected to the manifold. This causes the clutch 10 to be opened, due to the actuation of the vacuum unit 51, and hence shifting of the gears may be easily performed. Also, the switch 128 may be employed to obtain a free wheeling action.

Means is preferably provided for governing the rate of engagement of the low speed clutch 16 so as to avoid sudden or jumpy starting of the vehicle. This means is preferably responsive to the load or resistance torque in the power transmission path, and in the present instance is associated with the low speed clutch driving member 16" so as to govern its engaging movement. Thus, as illustrated in Fig. 2, each mounting sleeve 27 has a cam member 130 formed on its leading side arranged to engage an opposed surface on the side of the aperture 23 in the member 16" so that during axial clutch engaging movement of the member 16" rotation or driving force is transmitted from the fly wheel 15 to the driving member 16" solely through the cams 130. This transmission of driving force tends, by reason of the slope of the cam surfaces, to retard the engaging movement or to shift the clutch member 16" toward its open position, against the closing force of the clutch springs 31, and it will be evident that, in accordance with a predetermined relationship of the strength of the clutch springs and the slope of the cams 130, the power or force transmitted through the clutch 16 during its engaging movement may be limited and smooth application of power insured.

Similar means is provided for governing the engagement and speed of engagement of the high speed clutch 17, but such means is arranged to prevent engagement of the high speed clutch until the load is such that the vehicle may be propelled efficiently by the engine through the higher gear ratio associated with the high speed clutch. Thus a cam 131 of a steeper slope than the cam 130 is provided on the leading side of each sleeve 27 to engage an opposed bearing ball 132 mounted on the member 17" so that the load therebetween tends to prevent engagement of the clutch members.

During engaging movement of the high speed driving member 17", the driving force to the member 17" is transmitted solely through the cam members 131. In assuring this action a plurality of dowel pins 135, mounted on the member 16", extend slidably through openings in the member 17", so that the slight rotative shifting of the low speed driving member 16" during its clutch engaging movement, serves also to rotate or advance the member 17" and move it away from the driving abutment formed by the portion of the sleeve 27 intermediate the two cams. It will be noted that the springs 45, due to their angular mounting, normally urge the clutch member 17", and hence the member 16", into abutment with the sleeves 27 and their cams 131 and 130, the axial clutch opening movement of the member 17" being limited by abutment shoulders 136 formed on the cams 130.

Thus, in the starting of the car, the multi-speed clutch mechanism 10 operates automatically under the joint control of the engine speed and the load in the transmission path to cause successive engagement of its low and high speed clutches, so as to produce smooth starting and gradual acceleration of the vehicle. With a conventionally powered car this action may be attained in any of the various settings of the gear mechanism as determined by the setting of the shift lever. Hence the construction provides for automatic starting and stopping of the vehicle under the control of the engine speed, which constitutes, in effect, a control of the vehicle solely through operation of the accelerator.

With the high speed clutch 17 in its engaged position, its control cams 131 are, for practical purposes, disabled, since the frictional contact of the friction disk 17' with the fly wheel 15 and the member 17" prevents the relative reverse rotational movement of the member 17" which would be required in order for the cams 131 to exert clutch-opening force upon the member 17". Hence there is no fluttering of the connection between high and low speed even though sudden power is applied for purposes of acceleration.

During high speed operation of the vehicle, however, the drive may be transferred easily and instantaneously to the low speed clutch and its associated gearing, as for example, for purposes of acceleration. This is accomplished by momentary depression of the clutch pedal 50, so as to open the high speed clutch 17 and permit the cams 131 to re-assume their controlling action upon the driving member 17". The same result may be attained through the use of the switch 128. The engine speed may then be increased and the vehicle accelerated as desired. Having reached the desired speed, through the use of the low speed clutch and its associated gearing, the decrease in load causes the high speed clutch to engage automatically. This convenience of obtaining accelerating power is of particular importance in both the high and intermediate ranges of gearing, although it is applicable in any engaged position of the gearing mechanism.

It will be evident from the foregoing description that the present transmission mechanism may be applied advantageously to conventionally powered cars so as to obtain convenience and simplicity in operation, or that it may be applied equally as well to cars having relatively low powered and economical engines to attain efficient power application with the conventional gear-shifting and driving routine.

In its application to conventionally powered cars, the transmission may, with relation to the rear axle differential gearing, be so proportioned as to provide in the intermediate setting of the shift lever, a "city driving range" of gearing suitable for traffic conditions, and in the high position of the shift lever, to provide a "country driving range" of gearing, the ultimate driving ratio of which approximates the ratio now provided in cars of the over-drive or dual-ratio type. In both of these ranges automatic starting and stopping, as well as automatic shifting are attained, and moreover, the driver may instantaneously and by an easily performed foot movement, shift to the lower ratio of either range for purposes of acceleration. This down-shift may be attained with equal facility at any speed, and the return to the higher ratio takes place automatically and without further attention or conditioning by the driver.

When applied as a measure of economy to a vehicle having a relatively low powered engine, the conventional manual driving and shifting operations are required in a degree comparable to the operation of a conventionally designed car. However, the usual three-motion shifting routine causes the low powered engine to act successively through six graduated gear ratios to bring the vehicle smoothly and efficiently up to running speed. Hence the present day driving routine is retained, and yet satisfactory performance results with a low powered and economical engine.

I claim as my invention:

1. A transmission of the character described comprising, in combination, driving and driven members, low and high speed clutches normally urged resiliently toward closed positions and adapted when moved from their open positions to be connected successively with said driving member, means for opening said clutches, torque responsive means operatively connected between said driving member and said low speed clutch and operable automatically during high torque conditions existing during closing movement of the low speed clutch to oppose and retard such closing movement of the low speed clutch, independently operable torque responsive control means connected between said driving member and said high speed clutch and operable automatically during high torque conditions to oppose and prevent closure of said high speed clutch during such high torque conditions, a pair of concentric shafts driven by said clutches, a counter-shaft, gearing from the shaft driven by said low speed clutch providing an over-running connection with said counter-shaft, gearing of a different ratio connecting the other shaft to said counter-shaft, means including manually shiftable gearing for selectively establishing a plurality of different forward driving ratios between said counter-shaft and said driven member, and a manually operable shift lever for said shiftable gearing.

2. A power transmission mechanism comprising, in combination, driving and driven members, low and high speed clutches normally urged resiliently toward closed positions and adapted when moved from their open positions to be connected successively to said driving member, a transmission member driven from said high speed clutch, a transmission member driven from said low speed clutch, means including speed reduction gearing and an over-running clutch connecting said low speed transmission member to said driven member, means forming a higher ratio driving connection between said high speed transmission member and said driven member, torque responsive control means operatively connecting said driving member to said low speed clutch and operable automatically during high torque conditions existing during closing movement of the low speed clutch to oppose and retard such closing movement of the low speed clutch so long as the torque exceeds a predetermined response level, and independently operable torque response means connected between said driving member and said high speed clutch and operable automatically during high torque conditions to oppose and prevent closure of said high speed clutch until the torque is reduced materially below the torque response level of the torque responsive control means of said low speed clutch.

3. An automotive transmission of the character described comprising, in combination, a driving member, a driven member, low and high speed clutches, means operable normally to urge said clutches to closed positions by resilient force, a foot pedal operable when depressed to open said high and low speed clutches in succession against the resilient force of said clutch closing means, said low and high speed clutches being adapted to be closed successively when they are actuated from their open positions by said clutch closing means, torque responsive means operable to prevent engagement of said high speed clutch when the load exceeds a predetermined amount, a pair of concentric shafts, one driven by each of said clutches, a counter-shaft, gearing from the shaft driven from said low speed clutch providing an over-running connection with said counter-shaft, non-over-running gearing of a different and higher ratio drivingly connecting the other shaft with said counter-shaft, and means including manually shiftable gearing for selectively establishing a plurality of different non-over-running forward driving ratios between said counter-shaft and said driven member.

4. An automotive transmission comprising, in combination, driving and driven members, low and high speed clutches adapted for successive connection with said driving member, a counter-shaft, means connecting said low speed clutch with said counter-shaft including gearing and an over-running device, means forming a connection between said high speed clutch and said counter-shaft including non-over-running gearing of a different ratio, manually shiftable gearing mechanism for selectively establishing a plurality of different non-over-running forward driving ratios between said counter-shaft and said driven member, and means responsive to a running function of the engine for automatically controlling the opening and closing of said clutches.

5. A transmission of the character described comprising, in combination, driving and driven members, low and high speed clutches adapted for successive connection with the driving member, means for opening and closing said clutches, torque responsive control means operatively connected between said driving member and said clutches and operable automatically during high torque conditions to oppose the action of such clutch closing means to prevent closure of said high speed clutch during such high torque conditions, a gear shift lever having an H-type movement to a reverse position, or to low, intermediate or high positions, gearing mechanism having a transmission member connected by a low speed over-running gearing to said low speed clutch and by a higher ratio gearing to said high speed clutch, and means forming part of said gearing mechanism and operable by said shift lever to establish selectively, in the different positions of said lever, a reverse driving connection, or a low ratio forward driving connection, an intermediate ratio forward driving connection or a high ratio forward driving connection between said transmission member and driven shaft.

SIMEON BUDLONG.